United States Patent [19]
Lindahl

[11] Patent Number: 4,951,131
[45] Date of Patent: Aug. 21, 1990

[54] REMOTE CONTROL FOR CONVERGENCE OF PROJECTION TELEVISION

[75] Inventor: Clarence E. Lindahl, Knoxville, Tenn.

[73] Assignee: North American Philips Corp., New York, N.Y.

[21] Appl. No.: 313,663

[22] Filed: Feb. 21, 1989

[51] Int. Cl.$^5$ ............................................. H04N 9/31
[52] U.S. Cl. ...................................... 358/60; 358/10; 358/194.1; 315/368
[58] Field of Search ....................... 358/10, 60, 64, 65, 358/194.1; 315/368

[56] References Cited

U.S. PATENT DOCUMENTS

| | | | |
|---|---|---|---|
| 4,706,115 | 11/1987 | Colineau et al. | 358/60 |
| 4,754,204 | 6/1988 | Ando et al. | 315/368 |
| 4,769,643 | 9/1988 | Sogame | 358/194.1 |
| 4,807,052 | 2/1989 | Amano | 358/194.1 |
| 4,858,006 | 8/1989 | Suzuki et al. | 358/10 |

Primary Examiner—Howard W. Britton
Assistant Examiner—Kim Yen Vu
Attorney, Agent, or Firm—Emmanuel J. Lobato

[57] ABSTRACT

A viewer remote controlled convergence system for projection television typically having electron beams for the colors red, blue, and green is provided and preferably includes an infrared remote control transmitter and television circuitry. The infrared remote has a plurality of keys, a processor, and an infrared transmitter, with the processor causing the transmitter to transmit convergence adjustment signals in accordance with the selection of predetermined keys. The television circuitry includes an infrared receiver for receiving the convergence adjustment signals, a microprocessor for interpreting the received signals and for providing output control signals in response thereto, a plurality of digital to analog converters (DACs) under the control of the microprocesser for generating voltage signals in response to the control signals, and a plurality of yokes coupled to the DACs for receiving the voltages and deflecting the electron beams accordingly. For the horizontal and vertical control of both red and blue electron beams, four DACs and four inductive yokes are provided.

20 Claims, 3 Drawing Sheets

REMOTE CONTROL FOR CONVERGENCE OF PROJECTION TELEVISION

BACKGROUND

This invention relates generally to projection television, and more particularly to first order picture convergence adjustments for a projection television.

Projection television utilizes three picture tubes and three electron guns, including one tube and one gun for each of the colors red, blue, and green. In generating an image, it is desirable to converge the red, blue, and green images so that colored shadows are not present. Typically, the picture tubes of the projection television are adjacent each other with the green picture tube being central, and the red and blue tubes located on either side of the greentube. The three guns are necessarily angularly offset from each other, and introduce geometric distortion in the red and blue images. Means and methods for compensating for this geometric distortion such as by predistorting the signal are well known in the art. Such means and methods are not integral to the present invention and will not be considered herein. Those skilled in the art will appreciate, however, that additional distortion is introduced through other sources such as changes in supply voltage, component wear, handling, etc. Correction for this distortion has in the past been accomplished under manual control of the viewer though the use of simple left-/right an up/down controls on the projection television set (See, e.g. for detailed information: *NAP Consumer Electronics Corp. Manual* 7452A, Pages 45 and 46; A103-15 A001 Customer Convergence Panel, Schematic Diagram, and A10321C003 Convergence Panel, Schematic Diagram (1987)). As indicated in FIG. 1, which is a simplified block diagram derived from the referenced pages of Manual 7452A, the controls are essentially knobs of a potentiometer 17 which bridges a positive and negative supply voltage The voltage at the output of potentiometer 17 is then used as an input to a convergence amplifier 23 having a voltage gain equal to $R_f/R_i$. The current through the output of the convergence amplifier is sent through a convergence yoke 27 which provides an electromagnetic field for displacing the electron beam of the gun (not shown) Four sets of identical circuitry 13a–13d are used to provide both horizontal (left/right) and vertical (up/down) control for both the red and blue images.

The manual control for changing the voltage to the convergence amplifier permits a user to make manual convergence adjustments to the red and blue beams. These manual adjustments which usually are not made very often provide "fixed" convergence adjustments which are distinct from the continuous scanning adjustments used to deflect the beam as it scans the screen. The scanning adjustments, however, are outside the scope of this invention and are not discussed in detail herein. It should suffice to note that voltage inputs which control the scanning are also sent to the convergence amplifier and that the voltage outputs of the convergence amplifiers, and hence the currents through the yokes, are therefore dependent on both the continuous scanning adjustments as well as the "fixed" adjustments.

While the manual convergence controls of the prior art permit a viewer to accomplish the goal of adjusting the convergence of a projection television, they still suffer various drawbacks. First, because the convergence controls are located on the television set itself (and often on the back), a proper adjustment of the convergence may only be gained by repeatedly making adjustments and walking a distance away from the television screen in order to obtain a proper perspective of the convergence. Second, because the manual adjustments are conducted by turning the knobs of a potentiometer, a trade-off must be made between extremely fine control, and the willingness of a user to keep turning a knob. In other words, if the knob control provides its convergence range with only a small movement of the knob, extremely fine control is very difficult. On the other hand, if extremely fine control is desired, the user must turn the knob many rotations in order to make a small adjustment.

SUMMARY OF THE INVENTION

It is therefore an object of the invention to provide a system for conducting convergence adjustments of a projection television which is convenient for the viewer.

It is a further object of the invention to provide a system for conducting extremely fine convergence adjustments of a projection television in a simple manner.

In accord with the objects of the invention, a remote control convergence system is provided for conducting fixed convergence adjustments of a projection television. The remote control convergence system preferably includes a digital to analog converter (DAC) under the control of a microprocessor, with the DAC being coupled via a weighting resistor circuit to a convergence amplifier. The convergence amplifier is in turn coupled to a convergence yoke which effects electron beam deflection. Four microprocessor controlled DACs with associated resistor bridges and convergence amplifiers are utilized for conducting four controls: blue horizontal; blue vertical; red horizontal; and red vertical. The microprocessor controls the DACs in response to signals received by an infrared receiver from a viewer-controlled IR remote device In this manner a viewer may conduct the entire convergence operation from a location which provides the viewer with a good perspective. Additionally, because convergence may be obtained pressing and holding down a button of an IR device, extremely fine convergence adjustments may be easily and conveniently made.

Additional objects and advantages of the invention will become apparent to those skilled in the art upon reference to the detailed description in conjunction with the accompanying drawings.

DETAILED DESCRIPTION OF THE PREFERRED EMBODIMENT

Details of the remote control convergence invention as well as the television incorporating the same, including components related to the components comprising the invention may be seen with reference to NAP Consumer Electronics Corp. Technical Service Data Manual 7577 (1988) which was not publicly available until April 1988 at the earliest, and which is hereby incorporated by reference herein. In particular, the remote control convergence components of the invention may be seen on pages 61-64, and 72 of Manual 7577.

Figure 2:
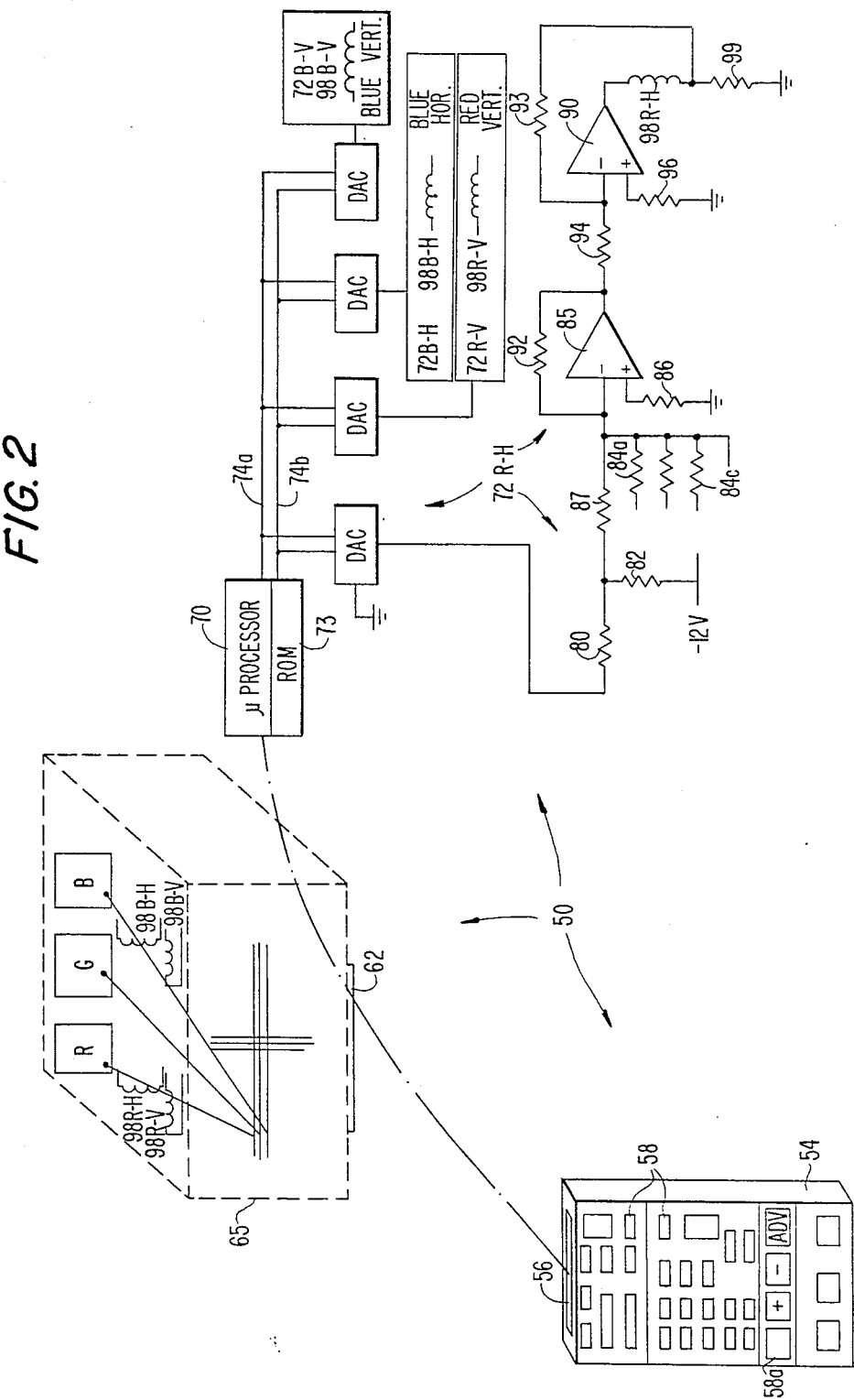
FIG. 2 is a part schematic part block diagram of the projection television remote control convergence adjustment system of the invention.

Turning to FIG. 2, the projection television remote control convergence adjustment system 50 of the invention is seen. A remote control device 54, preferably including an infrared transmitter 56 and a plurality of keys 58, is provided to permit a viewer to direct the convergence adjustment. While infrared remote control devices have become standard in the television remote control arts, it will be appreciated that any remote control system can be utilized. Likewise, the signals transmitted from the remote control device 54 may take any desired form provided that the remote control receiver 62 of the projection television 65 is capable of receiving, and the microprocessor 70 of the television 65 is capable of deciphering the same. Further, it may be desirable to provide the remote control device 54 with certain keys that are used only for convergence. Or, if desired, and as will be described in more detail hereinafter, one or more keys that are used for other functions (e.g. the channel up and down, sound up and down, or + and − keys) may double as convergence control keys when the remote control device 54 is in the "convergence adjustment" mode.

Upon receipt of signals from the remote control device 54, the remote control receiver 62 forwards the information it receives to a microprocessor 70 which interprets the information. Where the information concerns a convergence adjustment, the convergence adjustment subroutine of a ROM 73 associated with the microprocessor 70 is entered. Preferably, and as will be described in more detail hereinafter, in accord with the program stored in ROM, a single vertical and a single horizontal line of red, blue, and green are provided in the shape of a "+" on the television screen along with textual information which prompts the viewer (user). Thus, the viewer is led through a process where by pressing predetermined keys of the remote control device 54, information concerning the convergence adjustments is relayed to the microprocessor 70. In response, the microprocessor 70 provides a digital signal to the convergence adjustment circuitry 72. The digital signal is sent along with a clock signal over buses 74a and 74b to a digital to analog converter (DAC) 75 such as a DAC manufactured under part number TDA 8444 by Signetics Company, Sunnyvale, California. (Details of the DAC 75 and buses 74a and 74b may be seen with reference to TDA*8444* Specifications, 1986.) In a well-known manner, the DAC 75 receives the digital information and correspondingly provides therefrom a direct current (dc) voltage at its output. The dc voltage output of DAC 75 is then preferably adjusted by a weighting resistor circuit 78 (comprised of resistors 80, and 82) so that when the voltage from DAC 75 is in the middle of its range, a zero voltage is applied to summing amplifier 85. In particular, the voltage $V_o$ output to the amplifier 85 is determined as follows:

$$V_o = -12V(R_{82}/R_{80}) + V_{dac}(R_{82}/(R_{82}+R_{80}))$$

where $R_{80}$ is the value of resistor 80 and $R_{82}$ is the value of resistor 82 where resistor 82 is coupled to a negative twelve volt rail. With resistor 80 chosen at 10 Kohms, and resistor chosen at 20 Kohms, it will be appreciated that the output voltage $V_o$ will equal −4 V when the output voltage of DAC 75 is at its lowest voltage of zero volts, +4 V when the output voltage of DAC 75 is at its highest voltage of 12 V, and 0 V when the output voltage of DAC 75 is at a midrange of 6 V.

The output voltage $V_o$ is applied to summing amplifier 85 which has its negative input coupled to $V_o$ via resistor 87. The negative input is also coupled to other convergence signals via resistors 84a, 84b, ..., including circuitry relating to the continuous scanning which is not shown herein as it is not relevant to the instant invention. Feedback resistor 92 is also coupled to the negative input as well as the output of summation amplifier 85. Resistor 86 which coupled the positive input to amplifier 85 to ground provides stability.

Convergence amplifier 90 is a feedback amplifier with its negative input coupled to the output of summation amplifier 85, its positive input coupled to ground via stability resistor 96, and its gain equal to the ratio $R_f/R_i$ of resistors 93 and 94. The current into or out of the output of convergence amplifier 90 is applied to an inductive yoke 98 (preferably of 0.1 mH) which surrounds and deflects an electron beam (not shown) sent therethrough. Low resistance resistor 99 is provided to generate a voltage at the output of the inductive yoke 98 so that the voltage may be fed back via resistor 93 to the negative input of the convergence amplifier 90.

Figure 1:
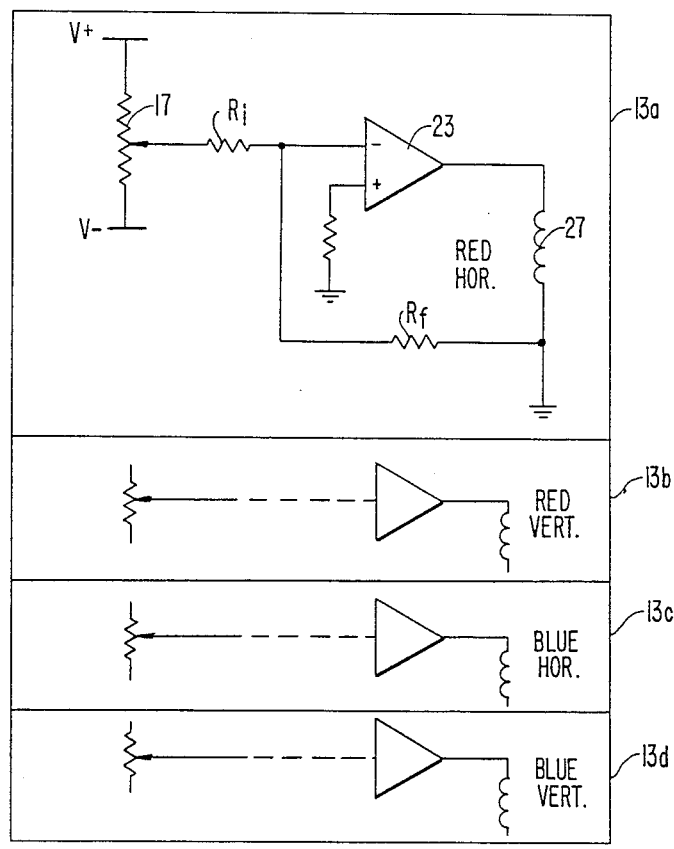
FIG. 1 is a simplified block diagram of the convergence adjustment system of a projection television of the prior art.

As previously indicated, a plurality of circuits 72 using DACs, weighting circuits and convergence amplifiers are used to conduct a plurality of adjustments. Thus, as shown in FIG. 1, identical circuits 72R-H, 72R-V, 72B-H, and 72B-V are used except that the yokes 98 are used to control the red horizontal and vertical, and the blue horizontal and vertical convergence adjustments respectively. All circuits 72 interface with the single microprocessor 70 which is also utilized for controlling other aspects of the projection television 65.

In the preferred embodiment of the invention the following components are utilized with component values and/or part numbers as listed:

| | |
|---|---|
| microprocessor | Part No. 6126690002 (Signetics) |
| DAC | TDA 8444 (Signetics Corp.) |
| amplifiers 85 and 90 | Part No. 6126220001 (Signetics) |
| Resistor 80 | 10K ohms |
| Resistor 82 | 20K ohms |
| Resistors 86, 94 & 96 | 2.2K ohms |
| Resistor 87 | 75K ohms |
| Resistor 89 | 4.7K ohms |
| Resistor 93 | 3.3K ohms |
| Inductor 98 | .1 mH |
| Resistor 99 | 2.5 ohms |

Figure 3:
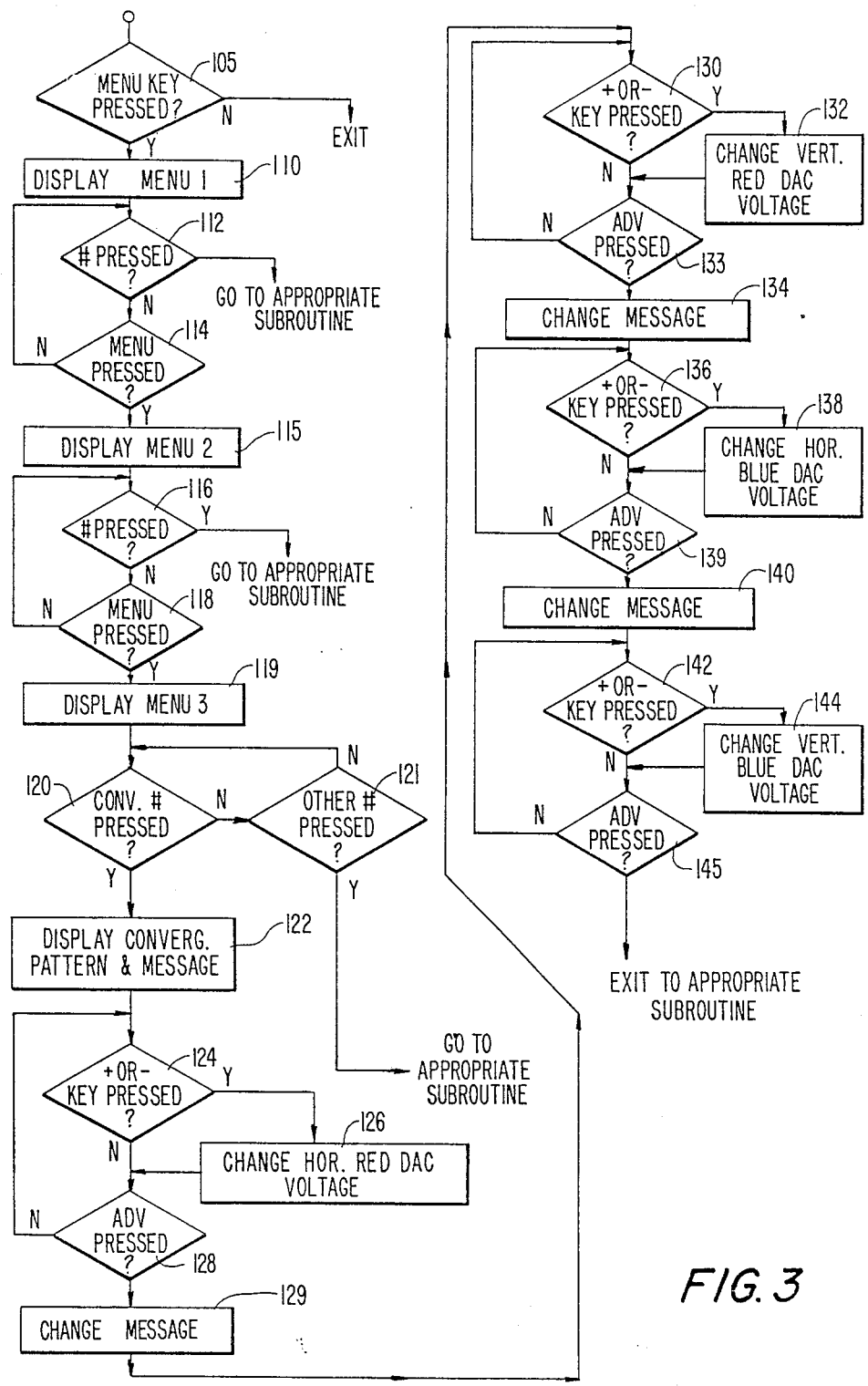
FIG. 3 is a flow diagram of the convergence adjustment routine of the microprocessor ROM of the invention.

Turning to FIG. 3, the convergence adjustment subroutine of the ROM 73 of microprocessor 70 is seen in flow-chart format and starts at step 120. However, prior to the start of the subroutine, a determination is made at 105 by microprocessor 70 as to whether the "menu" key 58a of the remote control transmitter 54 has been pressed If so, at 110, a first menu is arranged to appear on the television screen which primarily permits audio adjustment. If a numeral is pressed at 112, a corresponding feature is displayed and the user may adjust the same. If the user does not wish to adjust the audio, the user may press the menu key 58a again at 114 to provide visual controls (e.g. brightness, picture, color, tint, sharpness, and tuning). Again, the user may either press a numeral at 116 to adjust a corresponding feature, or the user may press the menu key 58a at 118 to bring up a third menu which is displayed at 119. In the third menu, the convergence control might appear with an associated number. If a number other than the associated number is pressed at 121, an appropriate subroutine is accessed. However, if the number key associated with convergence control is pressed at 120, the convergence control subroutine is entered.

Whenthe convergence control subroutine is entered, a convergence pattern as afore-described appears on the screen at 122 with a message such as: ADJUSTING CONVERGENCE. TO ADJUST RED HORIZONTAL TO THE LEFT, PLEASE PRESS "−". TO ADJUST RED HORIZONTAL TO THE RIGHT, PLEASE PRESS "+". TO CONTINUE PLEASE PRESS "ADV". At 124, the +, −, and ADV keys are scanned. If the + key is being pressed, the voltage output of the red horizontal DAC is increased at 126 appropriately under control of the microprocessor. Likewise, if the − key is being pressed, the voltage output of the red horizontal DAC is decreased at 126 appropriately under control of the microprocessor. If at 128 the ADV key is pressed, a new message appears on the screen at 129 such as: ADJUSTING CONVERGENCE. TO ADJUST RED VERTICAL UPWARDS PLEASE PRESS "+". TO ADJUST RED VERTICAL DOWNWARDS, PLEASE PRESS "−". TO CONTINUE PLEASE PRESS "ADV". Again, the keys are scanned at 130 so that the voltage output of the red vertical DAC may be increased or decreased appropriately at 132. If the ADV key is pressed at 133, a new message may appear at 134. The new message of 134 substitutes into the message of 122 the word "BLUE" for the word "RED", and the program continues through steps 136, 138, 139, 140, 142, 144 and 145 in a like fashion until the subroutine terminates or the user wishes to exit the convergence subroutine at 146,. The user exits the subroutine at any point by pressing a "status/exit" key of remote unit 54.

There has been described and illustrated herein a system for adjusting the convergence of a projection television by remote control. While particular embodiments have been described it is intended that the invention be broad in scope and that the specification be read likewise. Thus, while the invention relates primarily to projection television, those skilled in the art will appreciate that the invention can be applied to any television capable of convergence adjustments. Also, while particular circuitry was set forth for providing a controllable current through a yoke, it will be appreciated that other means for accomplishing the same could be provided. For example, rather than using a DAC and a weighting resistor circuit, a motorized potentiometer under control of the microprocessor could be utilized. Likewise, instead of using separate summing and convergence amplifiers, a single amplifier serving both functions could be utilized. Further, it will be appreciated that while individual circuit components of particular parameters were described as being utilized, components having different values or integrated circuits could be manufactured and utilized in their stead.

Those skilled in the art will likewise appreciate that the programming of the ROM can take various forms as well as different locations. For example, the prompting aspect of the ROM instructions could be located in memory of the remote control transmitting device itself such that the prompting display would occur on the transmitting device rather than on the projection television. Or, if desired, prompting might not be supplied, particularly where keys on the remote device were provided for convergence. The pattern created on the projection television could be other than single horizontal and vertical lines. The colors being adjusted (e.g. blue and red) might also be different if the location of the picture tubes was changed. Therefore, it will be appreciated that yet other changes and modifications can be made to the invention as described in the specification without departing from the spirit and scope of the invention as so claimed.

I claim:

1. In a receiver apparatus having means for adjusting the registration of at least a first electron beam relative to a second electron beam to promote convergence of a color television display, an improvement comprising:
    (a) receiving means for receiving a remote control signal furnished by a user positioned at a distance removed from said receiver apparatus, said remote control signal being indicative of a desired convergence adjustment for said first electron beam;
    (b) processing means coupled to said receiving means for processing said remote control signal and for providing an output control signal in response thereto;
    (c) electron beam deflection means coupled to said processing means for deflecting said electron beam in response to said output control signal;
    (d) control voltage output means comprising a digital to analog converter under control of said processing means for receiving said output control signal and providing a voltage signal within a predetermined range in response thereto, and a weighting resistor circuit coupled to said digital to analog converter for receiving the voltage signal of said digital to analog converter and offsetting the predetermined voltage range; and
    (e) wherein said electron beam deflection means is responsive to said voltage signal for deflecting said electron beam.

2. An apparatus according to claim 1, wherein:
said voltage signals of said digital to analog converter are direct current voltage signals.

3. An apparatus according to claim 1, wherein:
said voltage signals of said digital to analog converter are direct current voltage signals, and
said controlled voltage output means further comprises an amplifier means having a negative input coupled to said digital to analog converter output, a positive input coupled to a voltage source, and an output coupled to said electron beam deflection means and to said negative input.

4. An apparatus according to claim 3, wherein:
said controlled voltage output means further comprises a second amplifier means having a negative input coupled to said output of said amplifier means, a positive input coupled to a voltage source, and an output coupled to said electron beam deflection means and to said negative input of said second amplifier.

5. An apparatus according to claim 4, wherein:
said digital to analog converter provides said voltage signals within a predetermined range under control of said processing means, and
said controlled voltage output means further comprises a weighting resistor circuit coupled between said digital to analog converter and said negative input of said amplifier means for receiving said voltage signals of said digital to analog converter and offsetting said predetermined range.

6. An apparatus according to claim 1, wherein:
said controlled voltage output means comprises a horizontal control controlled voltage output means for providing a first voltage signal and a vertical control controlled voltage output means for providing a second voltage signal, and
said electron beam deflection means comprises a horizontal electron beam deflection means and a vertical electron beam deflection means, wherein said horizontal electron beam deflection means is coupled to said horizontal control controlled voltage output means and deflects said electron beam horizontally in response thereto, and said vertical electron beam deflection means is coupled to said vertical control controlled voltage output means and deflects said electron beam vertically in response thereto.

7. A system comprising an apparatus according to claim 6 in conjunction with a remote control device, said remote control device having a plurality of keys, a transmitting means, and a processing means coupled to said keys and transmitting means, wherein said processing means causes said transmitting means to transmit at least a first remote control signal indicative of a horizontal convergence adjustment and a second remote control signal indicative of a vertical convergence adjustment in response to the selection of at least one predetermined key.

8. An system according to claim 7, wherein:
said transmitting means comprises an infrared transmitter, and said receiving means comprises an infrared receiver, and said at least one predetermined key comprises at least a plurality of predetermined keys selected in a predetermined order.

9. An apparatus according to claim 6, wherein:
each of said horizontal control and vertical control controlled voltage output means comprises a digital to analog converter under control of said processing means.

10. An apparatus according to claim 9, wherein:
each said digital to analog converter provides respective voltage signals within respective predetermined ranges under control of said processing means, and
said controlled voltage output means further comprises at least two weighting resistor circuits, at least one weighting resistor circuit coupled to respective of said digital to analog converters, each of said weighting resistor circuits for receiving said voltage signals of respective said digital to analog converters and for offsetting said respective one predetermined ranges.

11. An apparatus according to claim 10, wherein:
each said controlled voltage output means further comprises a feedback amplifier means having a negative input coupled to its respective digital to analog converter output, a positive input coupled to a voltage source, and an output coupled to its respective electron beam deflection means, each said electron beam deflection means being further coupled to said negative input of its respective feedback amplifier.

12. An apparatus according to claim 1, wherein:
said receiver apparatus is in a projection television having three electron beams associated with three different colors, wherein said controlled voltage output means comprises a first color horizontal control controlled voltage output means, a first color vertical control controlled voltage output means, a second color horizontal control controlled voltage output means, and a second color vertical control controlled voltage output means, each coupled to said processing means and each providing a voltage signal in response thereto, and
said electron beam deflection means comprises a first color horizontal electron beam deflection means, a first color vertical electron beam deflection means, a second color horizontal electron beam deflection means, and a second color vertical electron beam deflection means, each coupled to a respective one of said controlled voltage output means for receiving voltage signals therefrom and for deflecting two of said electron beams horizontally and vertically in response thereto.

13. An apparatus according to claim 12, wherein:
each of said first and second horizontal control and first and second vertical control controlled voltage output means comprises a digital to analog converter under control of said processing means.

14. An apparatus according to claim 13, wherein:
each said digital to analog converter provides respective voltage signals within respective predetermined ranges under control of said processing means, and
said controlled voltage output means further comprises four weighting resistor circuits with one weighting resistor circuit respectively coupled to each of said digital to analog converters, each of said weighting resistor circuits for receiving said voltage signals of respective said digital to analog converters and for offsetting said respective predetermined ranges.

15. An apparatus according to claim 14, wherein:
each said controlled voltage output means further comprises a feedback amplifier means having a negative input coupled to its respective digital to analog converter output, a positive input coupled to a voltage source, and an output coupled to its respective electron beam deflection means, each said electron beam deflection means being further coupled to said negative input of its respective feedback amplifier.

16. An apparatus according to claim 15, wherein:
each said controlled voltage output means further comprises a summing amplifier menas having a negative input coupled to its respective digital to analog converter output, a positive input coupled to a voltage source, and an output coupled to respective summing amplifier negative inputs and respective said negative inputs of said feedback amplifier means.

17. A system comprising an apparatus according to claim 12 in conjunction with a remote control device, said remote control device having a plurality of keys, a transmitting means, and a processing means coupled to said keys and transmitting means, wherein said processing means causes said transmitting means to transmit at least a first remote control signal indicative of a horizontal convergence adjustment of a first color, a second remote control signal indicative of a vertical convergence adjustment of said first color, a third remote control signal indicative of a horizontal convergence adjustment of a second color, and a fourth remote control signal indicative of a vertical adjustment of said second color in response to the selection of at least one predetermined key.

18. An system according to claim 17, wherein:
said transmitting means comprises an infrared transmitter, and said receiving means comprises an infrared receiver, and said at least one predetermined key comprises at least a plurality of predetermined keys selected in a predetermined order.

19. A system comprising an apparatus according to claim 1 in conjunction with a remote control device, said remote control device having a plurality of keys, a transmitting means, and a processing means coupled to said keys and transmitting means, wherein said processing means causes said transmitting means to transmit at least a remote control signal indicative of a convergence adjustment in response to the selection of at least one predetermined key.

20. An system according to claim 19, wherein:
said transmitting means comprises an infrared transmitter, and said receiving means comprises an infrared receiver, and said at least one predetermined key comprises at least a plurality of predetermined keys selected in a predetermined order.

* * * * *

UNITED STATES PATENT AND TRADEMARK OFFICE
CERTIFICATE OF CORRECTION

PATENT NO. : 4,951,131
DATED : AUGUST 21, 1990
INVENTOR(S) : CLARENCE E. LINDAHL

It is certified that error appears in the above-identified patent and that said Letters Patent is hereby corrected as shown below:

Column 3, line 62, equation should read:

$$--V_o = -12\ R_{80}/(R_{82}+R_{80}) + V_{dac}\ R_{82}/(R_{82}+R_{80})--;$$

line 67, after "resistor" insert --82--.

Signed and Sealed this

Fifteenth Day of December, 1992

Attest:

DOUGLAS B. COMER

Attesting Officer

Acting Commissioner of Patents and Trademarks